Jan. 23, 1934.   F. FRELIN   1,944,708
PISTON
Filed Nov. 10, 1931
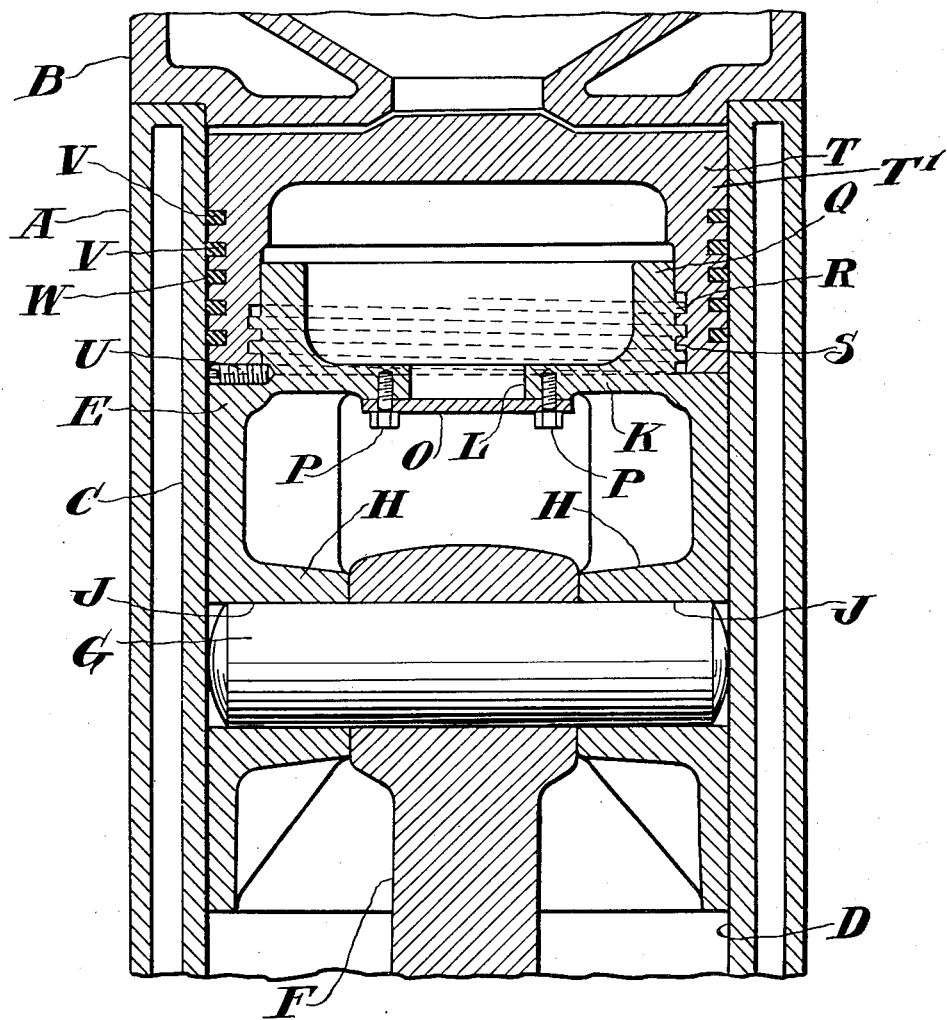
INVENTOR.
Fritjof Frelin.
BY
HIS ATTORNEY.

Patented Jan. 23, 1934

1,944,708

UNITED STATES PATENT OFFICE 1,944,708

PISTON

Fritjof Frelin, Phillipsburg, N. J., assignor to Ingersoll-Rand Company, Jersey City, N. J., a corporation of New Jersey Application November 10, 1931
Serial No. 574,095

1 Claim. (Cl. 309—15)

This invention relates to pistons, but more particularly to pistons for internal combustion engines and the like.

One object of the invention is to assure a firm connection between the component parts of a piston.

Another object is to maintain the weight of a piston to a minimum and at the same time eliminate the chances of excessive wear such as may be caused by the action of the sealing or piston rings.

Other objects will be in part obvious and in part pointed out hereinafter.

The figure in the accompanying drawing forming a part of this specification is a sectional elevation of a piston constructed in accordance with the practice of the invention and showing the piston arranged within a cylinder.

Referring more particularly to the drawing, A represents a cylinder and B a head therefor which may be secured to the cylinder in any suitable or well known manner. The cylinder A may be provided with a suitable space or chamber C for cooling water and is bored to form a piston chamber D for the reception of a piston E having a connecting rod F which may be connected to the piston E by the usual wrist pin G.

In accordance with the practice of the invention the piston E is constructed of light-weight metal, such as aluminum, and has a pair of internal bosses H which are provided with suitable apertures J for the reception of the ends of the wrist pin G.

The piston E is provided with an end wall K having an aperture L therein which may be normally closed by a plate O secured to the wall K as by means of screws or bolts P to prevent the passage of oil vapors through the aperture L. On the outer surface of the wall K and forming an integral part thereof is a longitudinally extending annular flange or ring-like extension Q having external threads R of the square type for engagement with similar threads S in the interior of a head T which is threaded on the extension Q. The head T preferably consists of steel, iron or similar metal having a comparatively low coefficient of expansion and the threads thereon are preferably a shrinkage fit on the threads of the extension Q.

In order to prevent the direct transmission of the heat of combustion to the piston E or, more particularly, to the extension Q, the skirt T' of the head T is of somewhat greater length than the extension Q, thus assuring a considerable space between the end of the extension Q and the end wall of the head T. As will be readily apparent, by reason of this construction the heat absorbed by the end wall of the head T must travel to the peripheral surface of the head T and along a considerable portion of the skirt T' before any of it will be transmitted to the extension Q. The interior of the piston E will, in consequence, remain comparatively cool so that any oil contacting therewith will not be reduced to a state of extreme fluidity, nor will the interior of the piston E become coated with burnt lubricating oil.

Additional means may be provided to assure the retention of the head T on the cylinder E. The means illustrated for this purpose consist of a screw U threaded into the cylinder E and the head T to partly engage both.

In the periphery of the head T are a series of grooves V for the accommodation of sealing or piston rings W of any well known type.

In practice a piston constructed in accordance with the invention has been found to be highly efficient. The weight of the entire piston may be considerably reduced and at the same time the piston has the advantage of being capable of fully withstanding the wear to which it is subjected by action of the piston rings.

Another extremely desirable advantage of the present invention is that, owing to the use of square threads as a means for connecting the piston to the head T and shrinking these elements together, a tight connection will at all times be assured between the piston and the head. This is due to the fact that the threads forming the connection between the piston and the head will expand uniformly in all directions.

I claim:

A piston having an end wall and an aperture in the end wall, a ring-like reduced extension on the end wall, a head threaded on the extension and forming a closure for the outer end of the extension, a skirt on the head and being of greater length than the extension to avoid contact between the extension and the end of the head, a cover within the piston seated on the end wall to form a closure for the interiors of the extension and the head, and means for securing the cover to the end wall.

FRITJOF FRELIN.